United States Patent [19]
Flocchini

[11] 3,908,599
[45] Sept. 30, 1975

[54] AUTOMATED GATHERING PEN FOR LIVESTOCK

[76] Inventor: Andrew J. Flocchini, 7050 Lakeville Hwy., Petaluma, Calif. 94952

[22] Filed: Mar. 13, 1974

[21] Appl. No.: 450,635

[52] U.S. Cl. ................................................. 119/20
[51] Int. Cl.² ....................................... A01K 29/00
[58] Field of Search ................ 119/14.03, 14.04, 20

[56] References Cited
UNITED STATES PATENTS
3,703,884 11/1972 Maddalena et al. ............. 119/14.03
3,805,741 4/1974 Thompson et al. ............... 119/14.04

*Primary Examiner*—Hugh R. Chamblee
*Attorney, Agent, or Firm*—Townsend and Townsend

[57] ABSTRACT

An animal corral for the prodding movement of livestock from an animal receiving station to an animal processing station is disclosed. The pen includes paired, parallel, elongate pen sides extending between a livestock receiving station at one end and a livestock processing station at the other end. A gate is typically mounted to move between the sides from the livestock receiving station to the livestock processing station. A continuous loop of reeving running the full length of the corral sides drives the moveable gate on both sides where it is adjacent to the paired, elongate corral sides. The loop is powered by a driving mechanism which includes a specialized transmission. This transmission provides power for the ordinary unobstructed movement of the gate and acts to sense when the gate encounters resistance to forward motion, such as that resistance provided by contacting recalcitrant livestock within the pen. The sensing of the motor is accomplished by a power-sensing means which connects to appropriate circuitry to interrupt the forward movement of the fence for a preselected interval of time. At the end of this interval of time, forward sweeping movement of the gate recommences. Through sequential stop and start movements of the gate, prodding of the livestock within the pen from the animal receiving station to the animal processing station occurs. This invention relates to livestock corrals and more particularly to a livestock corral for sweeping animals from a receiving station to a processing station.

10 Claims, 10 Drawing Figures

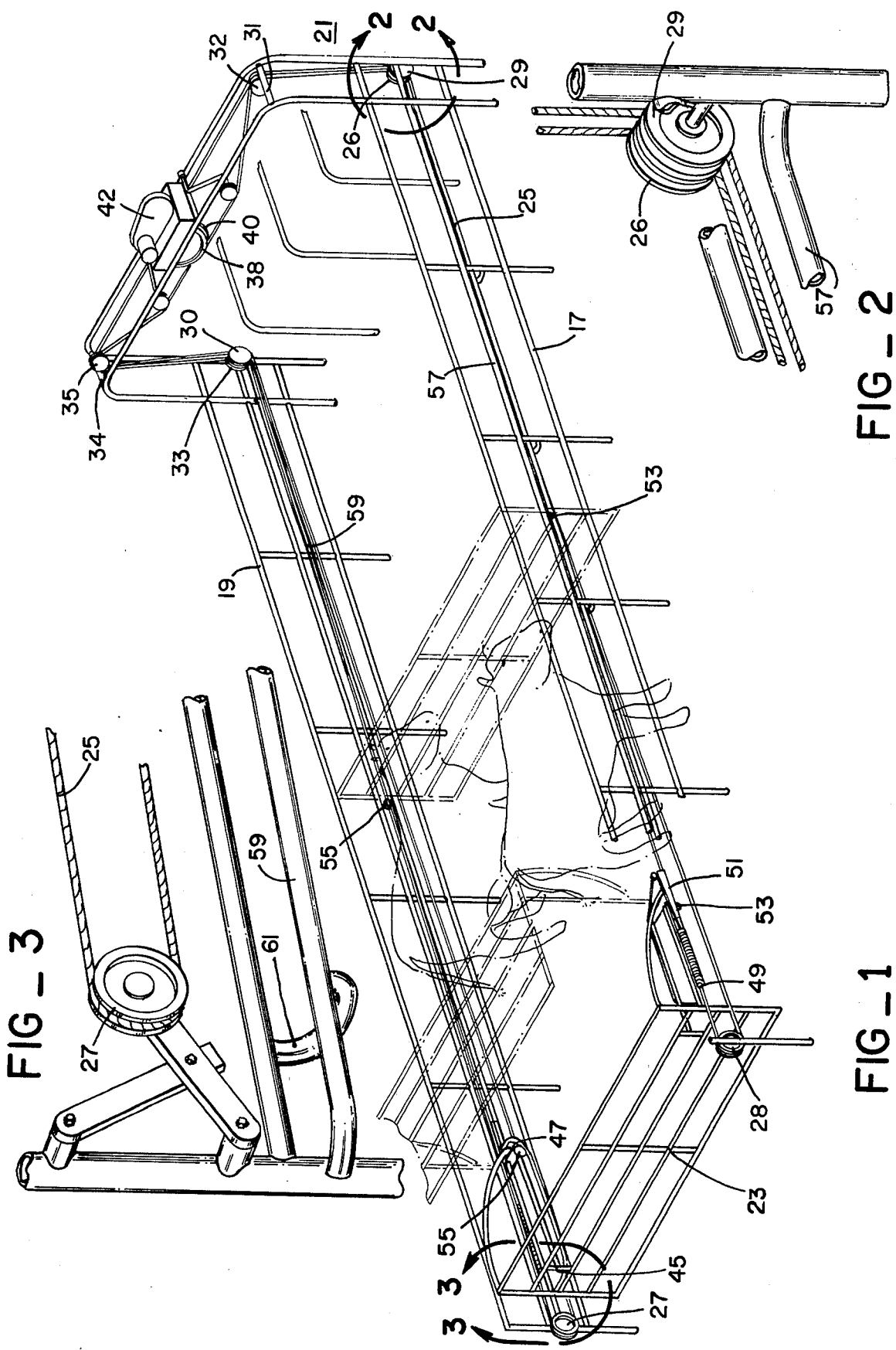

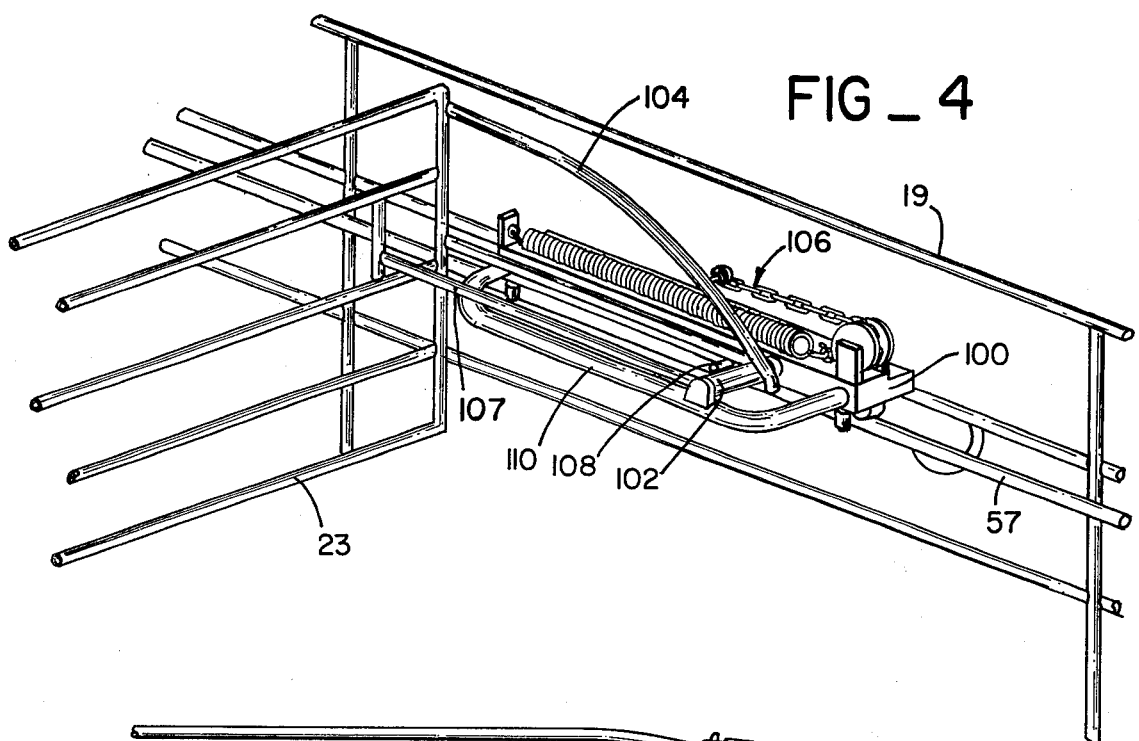
FIG_4
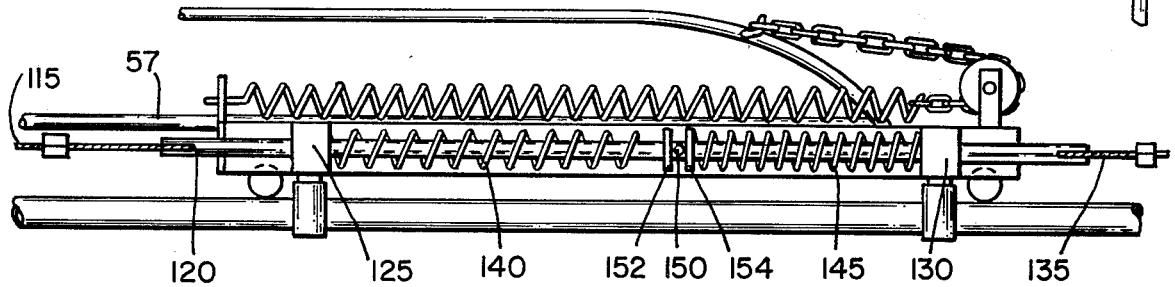
FIG_5
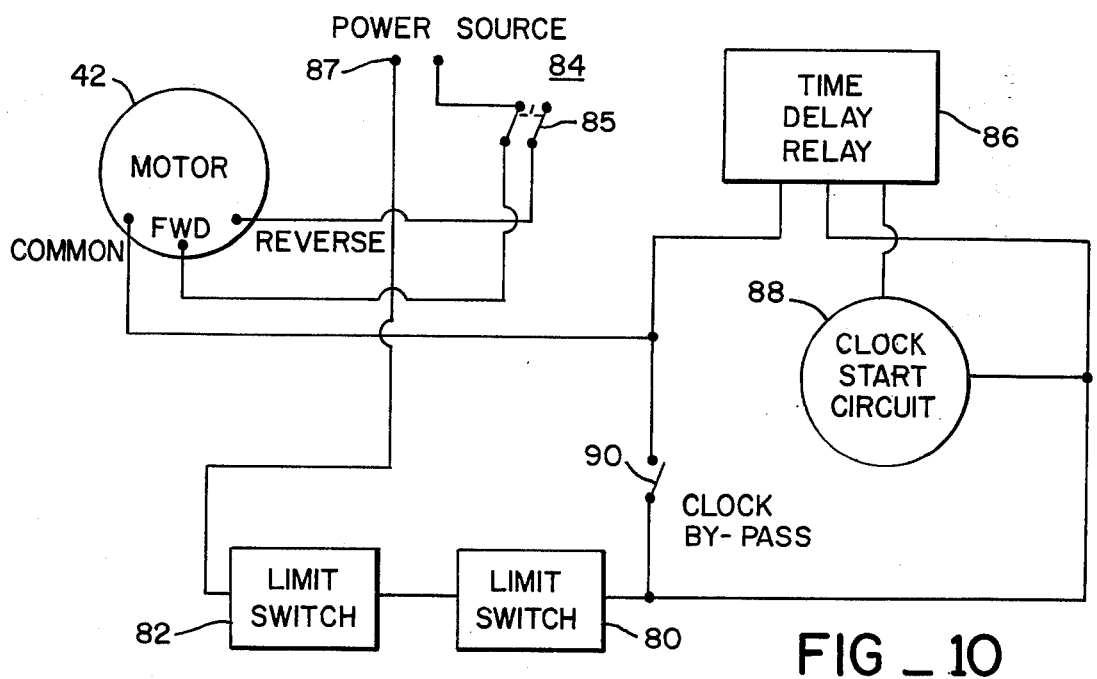
FIG_10

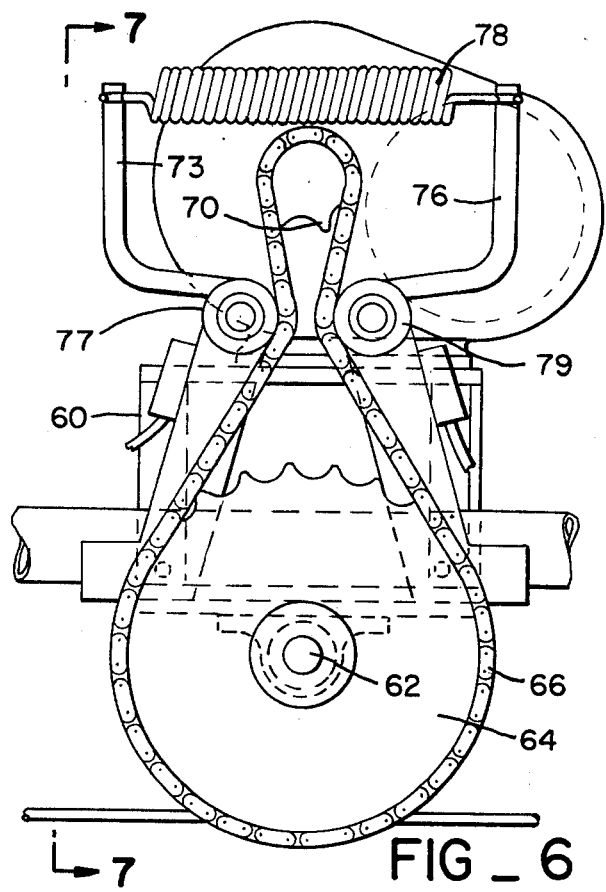
FIG_6
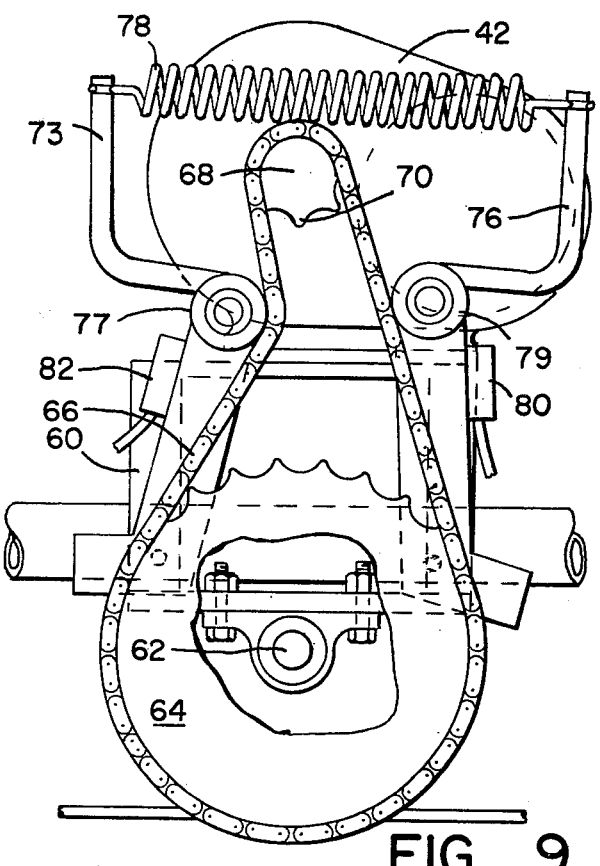
FIG_9
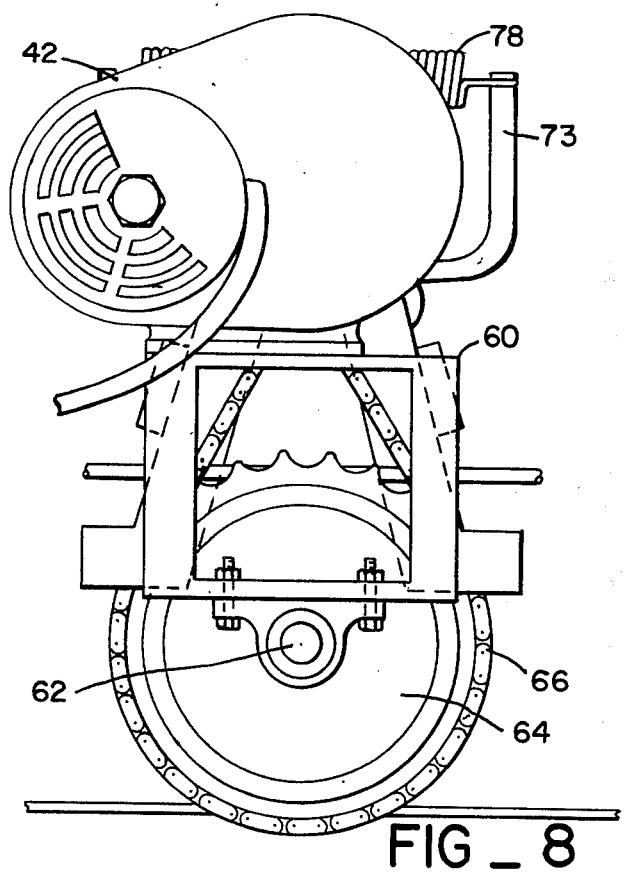
FIG_8
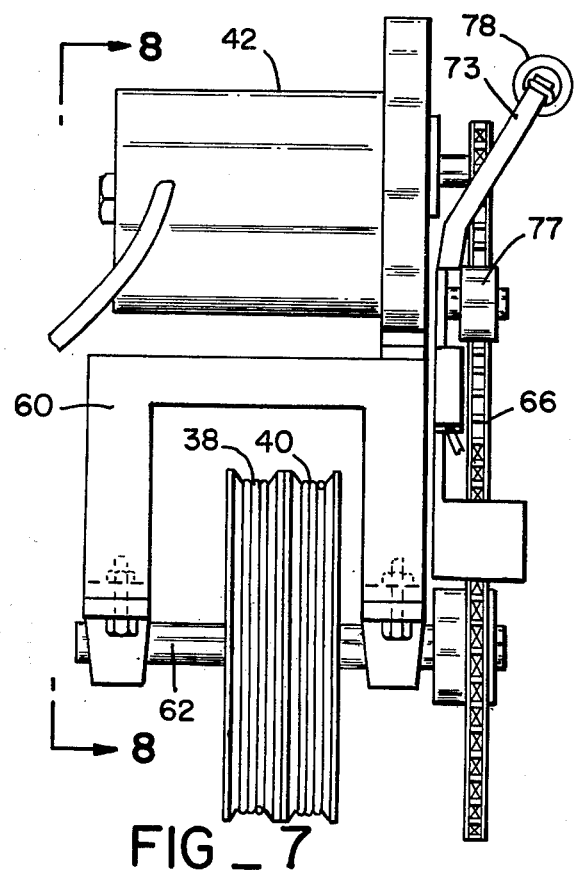
FIG_7

AUTOMATED GATHERING PEN FOR LIVESTOCK

SUMMARY OF THE PRIOR ART

Livestock gathering corrals are known. Typically, such livestock gathering corrals include parallel sides having a motored gate sweeping the corral from a livestock receiving station to a livestock processing station. These prior art embodiments have included, however, serious deficiencies.

First, the moveable gate requires the presence of an operator whose attention is directed solely to the movement of livestock in the corral. This operator must either manually drive the gate of alternately regulate the movement of the gate to a rate which does not panic or unreasonably disturb livestock within the corral. This is time consuming and expensive.

Secondly, the movement of such gate heretofore has not desired to conform to the forward progress of the livestock to the animal processing station. The gates have been typically constructed to move at a preselected an unchanged forward rate of motion. If livestock processing stations are either handled at a rapid rate or a slow rate, the forward movement of the gate does not typically conform to the rate of livestock movement through the corral. The result is that either constant operator attention must be given to the movement, or, alternately, gate movement and livestock movement do not conform. When gate movement and livestock movement do not conform, either the pen operates inefficiently and slow or it alternately serves to panic and injure animals being processed.

Regarding such automated gates, those familiar with livestock will appreciate that the gates often contact only the most recalcitrant of the livestock. These recalcitrant animals lag behind and often have the most uneven and dangerous of animal dispositions. Contacting such animals with unprogrammed, mechanical gate movement is not only undesirable, but often dangerous.

A further tendency of the prior art has been the proclivity of such automated gates to jam. Typically, the recalcitrant livestock will stand to one side of the corral, or to another side of the corral. When the gate strikes such an animal at the side of the corral, the side of the gate striking the animal remains stationary while the opposite side of the gate continues forward movement. This cants or jams the gate by advancing one side of the gate and retarding the other side of the gate. Operator attention is required to realign the gate to a normal forward moving position as well as to manually prod the livestock, such as a recalcitrant cow, forward and out of the path of the gate.

A final deficiency mentioned here is the tendency of gate drive known in the prior art to break or jam when striking livestock in their sweeping path. The large mass of livestock compared to the relatively small mass of moving and sweeping gate can result in jamming of the driving mechanism. Automated gates in the prior art have often overlooked this practical problem.

SUMMARY OF THE INVENTION

An animal corral for the prodding movement of livestock from an animal receiving station to an animal processing station is disclosed. The pen includes paired, parallel, elongate pen sides extending between a livestock receiving station at one end and a livestock processing station at the other end. A gate is typically mounted to move between the sides from the livestock receiving station to the livestock processing station. A continuous loop of reeving running the full length of the corral sides drives the moveable gate on both sides where is is adjacent to the paired, elongate corral sides. The loop is powered by a driving mechanism which includes a specialized transmission. This transmission provides power for the ordinary unobstructed movement of the gate and acts to sense the gate encounters resistance to forward motion, such as that resistance provided by contacting recalcitrant livestock within the pen. The sensing of the motor is accomplished by a power-sensing means which connects to appropriate circuitry to interrupt the forward movement of the fence for a preselected interval of time. At the end of this interval of time, forward sweeping movement of the gate recommences. Through sequential stop and start movements of the gate, prodding of the livestock within the pen from the animal receiving station to the animal processing station occurs.

OTHER OBJECTS AND ADVANTAGES OF THE INVENTION

An object of this invention is to disclose a mechanism for motorizing sweeping gate movement in a time-sweep sequence that prods but does not panic livestock within the corral. According to this aspect of the invention, the gate is moved forward at a preselected rate by a power source. When the gate contacts an obstruction within the corral, such as a recalcitrant cow, the gate moving mechanism senses the additional power required for forward movement and stops the forward movement for a predetermined time. At the end of this time period, forward gate movement recommences.

An advantage of this type of gate movement is that the gate effectively prods livestock in its path. The gate does not act to force or move the animals. Incident of animal panic or stampede within the confines of the corral is minimized.

A further advantage of this disclosed gate movement is that the continual undivided attention of an attendant directed to the sweeping and forward movement of the gate is not required. It is merely required to initiate the sweeping motion of the gate. Further attendant attention to the forward motion of the gate is not required.

Yet an additional advantage of the disclosed gate movement is that the gate in sweeping the corral, sweeps the corral at a rate which conforms to the movement of the livestock through the corral. If the cattle move through the gate slowly, the progress of the sweeping gate from one end of the corral to the opposite end of the corral is correspondingly slow. Alternately, if the livestock move through the corral rapidly, the movement of the gate from the receiving station to the processing station is correspondingly faster.

A further object of this invention is to reeve the gate and drive the gate through the reeving between the opposed sides of the corral so that force on the gate adjacent to one corral side or to the other corral side does not cause gate jamming. According to this aspect of the invention, the reeving driving gate consists of a continuous loop of constant length extending down each side of the corral to each of the loop ends. Each gate is driven by attachment to the loop at segments of the loop which move in the same direction upon power source rotation of the loop strands.

An advantage of this aspect of the invention is that since each side of the gate is fastened to a portion of endless belt of fixed length, it is not possible for one side of the gate to advance relative to the other side of the gate. Thus, when livestock strike the gate in an unsymmetrical fashion, as at one side of the gate, or at the opposite side of the gate, relative movement of one side of the gate to cant the gate and cause jamming is not possible.

Yet another advantage of the power reeving to the gate is that the gate can be connected to the reeving through dampers. These dampers can ease the shock of the gate upon contact with relatively heavy livestock while at the same time prevent gate jamming due to gate canting.

A further advantage of the present invention is that the reeving can be used to transmit to the power source the increased load necessary to drive the gate forward when it strikes an object. This increased load can be used at the power source to provide the improved prodding gate motion of this invention.

Yet another advantage of the reeving herein disclosed is the gate can be driven toward and away from the animal processing station. Thus, when the corral is emptied of livestock, automated return of the gate to the animal receiving station can be accomplished.

A further object of this invention is to disclose a gate driving mechanism with a simplified apparatus for detecting impeded gate forward movement. According to this aspect of the invention, the endless loop is driven through a drum by means of a chain and sprocket drive to a motor. The chains of the chain and sprocket drive are biased inwardly by limit switch sensors. When normal unobstructed gate movement occurs, the limit switch sensors do not open. When abnormal and restricted forward motion of the gate occurs, the limit switch sensors open and thus detect obstructed forward movement and initiate the prodding gate movement sequence of this invention.

An advantage of this simplified drive is that the power source used to move the gate forwardly can be used to initiate the prodding livestock sequence.

Yet a further advantage of this method of detection of forward gate motion is that no end of gate run limit switches are required. Correspondingly, electrical connections to one end of the gate run, or to the other end of the gate run, are not required.

Yet a further advantage of this invention is that the gate itself does not have to include detecting mechanisms for stopping forward movement upon contact of the gate with livestock. In sum, remote gate movement sensors are not required; mere sensing of the power necessary for gate forward movement at the motor drive is all that is required.

A further object of this invention is to disclose a mounting of the gate at rails on the opposite sides of the gate which permit secured gate pivotal movement from a vertical prodding position to overlying horizontal and open position. According to this aspect of the invention, two traveling sidecars are riding on rails adjacent, each of the corral side walls are driven by being securely fastened to the constant length endless loop. The driven sidecars form secure points from which the gate can pivot from a vertical prodding position to a horizontal and overlying position in which the corral is open to receive livestock at the livestock receiving station.

Yet another object of this invention is to disclose a pivotal mounting of the gate to the sidecars which prevents livestock from inadvertently opening the gate. In accordance with this aspect of the invention, the pivot axis of the gate from its vertical position to its horizontal position is carried in front of the gate and toward the livestock sweeping movement of the gate.

An advantage of the gate as disclosed is that livestock upon kicking the gate, cannot open it. As the kicking action of the livestock would have to pivot the gate upwardly and forwardly over the top of the animal before escape would occur, animal-caused opening of the gate is virtually impossible.

A further advantage of the gate as disclosed in this invention is that it is easily opened from the side away from the animals. According to this aspect, an operator approaching the gate from the animal receiving station can easily pivot the gate upwardly and forwardly in the manner of a garage door opened from the outside to effect gate opening.

Other objects, features and advantages of this invention will become more apparent after referring to the following specification and attached drawings.

IN THE DRAWINGS

FIG. 1 is a perspective view, partially broken away of the automated gathering pen of this invention showing the moving gate at the animal receiving station closed and indicating medially between the animal processing station and the animal receiving station forward livestock sweeping movement of the gate to move livestock from the animal receiving station to the animal processing station;

FIG. 2 is a detail of the gate reeving in area 2—2 of FIG. 1;

FIG. 3 is a similar detail of the gate reeving in area 3—3 of FIG. 1;

FIG. 4 is a perspective view of the car to which the gate is mounted, together with the rail, illustrating the gate in the closed, sweeping position;

FIG. 5 is a side elevational view of the car shown in FIG. 4, illustrating the shock absorbing feature of the gate mounting to the endless loop as well as the means for biasing movement of the animal gate from the sweeping position to an open position;

FIG. 6 is an enlarged detail of the driving mechanism of this invention during normal forward gate movement taken along line 6—6 of FIG. 1;

FIG. 7 is a side elevation of the gate drive mechanism of this invention taken along line 7—7 of FIG. 6;

FIG. 8 is a rear elevation of the gate drive mechanism of this invention taken along line 8—8 of FIG. 7;

FIG. 9 is a view of the drive mechanism shown in FIG. 6 with the gate mechanism acting to sense the obstruction of the forward motion of the gate upon an obstacle, such as a recalcitrant cow; and FIG. 10 is a schematic diagram of electrical circuitry useful for initiating the forward prodding movement of the gate in accordance with this invention.

Looking to FIG. 1, the parts and construction of the present invention can be understood. The cattle gathering invention herein described and claimed is generally composed of opposing side partitions or pen sides 17 and 19. Positioned at one end of said partitions 17 and 19 and shown is animal processing station 21. Slideably mounted between side partitions 17 and 19 and shown at the other end of said cattle gathering pen is moveable gate 23. IT will be noted that moveable gate 23 is drawn toward animal processing station 21 be means of endless loop of running rigging 25, which is carried by a series of pulleys 26, 27, 28, 29, 30, 31, 32, 33, 34 and 35, and driven by sheeves 38 and 40 powered by motor 42. It will be seen that, as motor 42 is activated, sheeves 38 and 40 will drive running rigging 25 to draw the moveable gate forward, thereby inducing the livestock shown in FIG. 1 to proceed toward animal processing station 21.

Now that the operation of the cow gathering pen has been generally set forth, its individual components can be described with specificity.

Looking to FIG. 1, and specifically toward the animal processing station therein depicted, a continuous and endless loop 25 of constant length is shown reeved to drive the moveable gate 23 of this invention. The loop here shown is driven at a medial point on both strands and has the respective ends of the loop extended the length of each of the opposing side partitions 17 and 19.

It will be seen that continuous loop 25 is rigged so that it is wrapped about sheeve 38 three times in clockwise fashion drawn through pulleys 34 and 30, run parallel partition 19, and through pulley 27 at which point one of its ends is connected to the back of moveable gate 23 at point 45. Another portion of continuous loop 25 is attached to the front of moveable gate 23 at point 47, passed through sheeves 33 and 35, wrapped three times in counter-clockwise fashion about sheeve 40, passed through pulleys 31 and 29, run the length of partition 17, passed through pulley 28, and connected to the back of moveable gate 23 at point 49.

Similarly, another section of continuous loop 25 is connected to the front of moveable gate 23 at point 51, passed through pulleys 26 and 31, and thence clockwise about sheeve 38 as described previously.

It will be understood that sheeve 38 proceeds in clockwise fashion, the continuous loop of cable will be advanced so that gate 23 will proceed toward animal processing station 21. It will be further seen that, as a result of wrapping the continuous loop three times counter-clockwise about sheeve 40 and by connecting the cable ends to the gate in the manner shown, the cable revolves in a continuous loop providing equal pull to each side of moveable gate 23. When motor 42 is reversed, counter-clockwise, moveable gate 23 will return to animal receiving station 15.

It also will be noted that the pull on the gate exerted by the cable segment attached to its back is equal.

Moveable gate 23 is mounted on wheels 53 and 55 on outrigger bars 57 and 59, respectively. Outrigger bars 57 and 59 are mounted medially on partitions 19 and 17 and by J-shaped brackets one of which is shown as 61 away from such partitions so that moveable gate 23 may sweep the length of the animal gathering pen without impediment.

Now that the rigging of the cable through the pulleys and sheeves has been described, the power transmission and power sensing means may now be described. Referring to FIG. 7, which is a side elevation of the gate drive mechanism, it will be seen that motor 42 is mounted about bracket 60 which holds sheeves 38 and 40 journalled on shaft 62. As will be observed from viewing FIG. 8, shaft 62 is provided with sprocket 64 driven by chain 66.

Referring to FIG. 9, it will be seen that chain 66 is in turn driven by spline 68, emanating from motor 42 and provided with sprocket 70.

Now that the power and drive mechanisms have been set forth, the power sensing mechanism may now be understood. Referring specifically to FIG. 6, it will be seen that chain 66 is mounted about sprockets 64 and 70 so that there is an increment of slack remaining after it has been mounted. Levers 73 and 76 carry rollers 77 and 79. Each of said levers are mounted on either side of chain 66 and between sprockets 64 and 70. Levers 73 and 76 are so mounted that rollers 77 and 79 impinge upon chain 66, thereby taking up its slack. Rollers 77 and 79 are biased against chain 66 by the force of spring 78, which is mounted between the ends of levers 73 and 76.

It will be understood that, when traveling gate 23 strikes the rear portion of a recalcitrant cow, tension will be transmitted from the cable rigging to the sheeves. This tension will be transmitted to chain 66 as a result of the increased output of motor 42 to drive sprocket 64 and thence the sheeves. The tension transmitted to chain 66 will cause it to tighten, thereby countering the bias of chain 66 and causing rollers 77 and 79 to move away from the chain. Such a state of tension will be seen in FIG. 9. Under such conditions of tension, when traveling gate 23 strikes an impediment, the movement of either lever 73 or 76 will trip limit switches 80 or 82, thereby terminating power to motor 42.

At this point, and referring specifically to FIG. 10, the function of the electrical circuitry used with this invention is best understood.

A power source 84 is connected through a forward-reverse switch 85 to drive motor 42. Motor 42 is of the type having a common terminal, a forward motion terminal, and a reverse terminal. By selectively moving forward-reverse switch 85 to connect power source 84 across the common and forward terminal results in forward motion movement. Similarly, by moving power switch 85 to the reverse position (not shown) reverse movement of motor 42 and correspondent reverse movement of the gate 23 is generated.

The common terminal from power source 84 is connected through the clock-start circuit 88 and time delay relay 86 to effect the programmed motion of this invention. Specifically, common terminal 87 from power source 84 is serially connected through limit switches 80 and 82 which in turn are operably connected to lever arms 73, 76 respectively of the transmission illustrated in FIG. 6–9. The circuit is then series connected across the time delay relay to the common connection of motor 42.

Limit switches 80, 82 are of the normally closed variety. When gate 23 encounters increased resistance to forward motion, and either of the levers 73, 76 move responsive to increased chain 66 tension, the common connection to motor 42 is interrupted by the opening of either of the limits switches.

This provides two results: First, forward motion of the motor is interrupted. Secondly, clock-start circuit 88 senses the power interruption in the common connection to motor 42. This circuit initiates the clock cycle in time delay 86. Typically, time delay relay 86 causes the circuit between common connection 87 in the common connection of 42 to remain open for a preselected period of time which is adjustably variable in the range of 1 to 6 minutes. When the clock has completed running, the circuit between common connection 87 and motor 42 through the time delay relay is closed, and forward motion of gate 22 commences.

Clock start circuit 88 and time delay relay 86 are standard items of manufactures sold by the Cramer Company of Old Saybrook, Connecticut, under the name Cramer 472A-A.

It is at times necessary to bypass the time delay relay. According to this aspect, a bypass switch 90 is provided across the common connection which allows the respective limit switches 80, 82 to interrupt forward gate motion but bypasses the operation of the time delay relay and clock starting circuits.

Now that the power sensing means and supporting electrical system has been described, the construction and operation of the movable gate will be understood. Referring specifically to FIG. 4, this gate be seen in perspective. It will be remembered that once the gate has swept the corral, intermittently prodding cows toward the animal processing station, 21, reversal of the motor enables the operator to motivate the gate backwards to the animal receiving station. It is to be expected that bovine animals will have come between the two partitions of the corral following their kind which have been prodded forward by the traveling gate. Thus, to avoid pusing animals out of the receiving end of the cattle gathering pen, as soon as the traveling gate reaches the animal processing station, gate 23 can be swung upward into horizontal position so as it travels backward toward the animal receiving station it will clear any beast which has wandered between the partitions 19 and 17. An example of the gate in elevated position is shown in phantom in FIG. 1.

Referring again to FIG. 4, it will be seen that block 100 is mounted medially of partition 19. Traveling gate 23 will rotate upward about block 19 by means of pin 102. Arms 104 and 106 link traveling gate 23 to pin 102. It will be seen that the upward travel of gate 23 is prevented by spring and cable arrangements 106.

Thus, when livestock being gathered by moveable gate 23 kick or strike the gate, it will not fly upward, thereby releasing them from the pen. It is noted that when the gate is in horizontal position, it is kept from flopping out of the horizontal position by bar 108 which impedes the forward progress of the end of arm 104. It will further be noted that bar 107 of gate 23, when the gate is in vertical position, rests on brace 110 which keeps it vertical with respect to the ground.

Referring finally to FIG. 5, it will be noted that a shock absorber system to prevent stretching and/or breaking of the continuous loop of cable 25 is shown. Typically, end 115 of one segment of the continuous loop is affixed to one end of iron rod 120 at the back portion of the gate. It will be seen that iron rod 120 passes through sleeves 125 and 130 transverse the forward direction of gate 23. It will be seen that end 135 of another end of the segment of continuous loop 25 is attached to the other end of rod 120 at the front of the gate. Backward and forward travel of iron rod 120 is regulated by springs 140 and 145. The springs are compressed as the gate is drawn backward and forward by cable segments 115 or 135 by keeper nut 150 in cooperation with washers 152 and 154. Thus, when motor 42 drives sheeves 38 and 40, the initial shock resulting from the immediate pull by either cable segments 115 or 135 on the resting weight of the gate will be cushioned by the bias of either spring 140 or 145.

It should be noted that rod 120 completes the endless loop 25 and maintains the loop of constant length.

I claim:

1. In an animal gathering pen of the type having one of its ends terminating in an animal receiving station, another of its ends terminating in an animal processing station, a pair of parallel, elongate sides extending between said ends, a gate moveable between both said sides for sweeping animals within the pen from said receiving station to said animal processing station, means coupling said gate to said sides for moveable support of said gate, and running rigging to effect the sweeping movement of said gate, the improved driving mechanism, comprising a motor, means for driving said running rigging to move said gate, a transmission between said driving means and said motor for transmitting power to said driving means to drive said running rigging to move said gate, means for mechanically sensing power transmitted by said transmission operably connected to said transmission, said power sensing means sensing power transmitted by said transmission exceeding that normally required to drive said gate, and means for interrupting operation of said motor for a preselected period of time, including a timer having an adjustable period operatively connected to said power sensing means to thereby stop sweeping movement of said gate for said preselected period of time when said gate strikes an obstacle during said sweep of said pen.

2. The invention of claim 1 wherein said driving means includes a pair of sheeves operably connected to said motor to power said running rigging.

3. The invention of claim 2 wherein said transmission means includes a first sprocket mounted on said sheeves, a second sprocket mounted on said motor, and a chain carried by said sprockets to transmit power from said motor to said sheeves.

4. The invention of claim 3 wherein said power sensing means includes at least one lever pivotally mounted adjacent said chain, one end of which impinges against said chain and the other end of which communicates with said interrupting means, so that when said chain is placed under tension by increased torque of said motor, said lever will be moved to activate said interrupting means.

5. In an animal gathering pen of the type having one of its ends terminating in an animal receiving station, another of its ends terminating in an animal processing station, a pair of parallel elongate sides extending between said ends, a gate moveable between both said sides for sweeping animals within the pen from said receiving station to said animal processing station, said gate having a first gate end and an opposite second gate end, means coupling said first and second gate ends to said sides for moveable support of said gate, and rigging to effect the sweeping movements of said gate, an improved rigging system comprising a continuous and endless loop, composed of at least two side-by-side cable strands, one segment of said loop having side-by-side strands rigged along the length of one of the respective sides, another segment of said loop having side-by-side strands rigged along the lengths of the other of the respective sides; and one of said strands of said endless loop being wound about at least one sheave mounted to said pen; and means for driving said sheave to move adjacent side-by-side strands of said endless loop in opposite directions; and said gate ends, fastened to commonly moving strands with one gate end fixed to one strand of one segment of said loop and the other gate end fixed to one strand of another segment of said loop so that when said sheave is driven, said gate ends will be moved equally by equal motion of said endless loop strands on opposite sides of said corral to sweep said gate forward or backward evenly and without binding.

6. The invention of claim 5 including an additional sheeve for taking up and paying out a second portion of the middle of said loop.

7. The invention of claim 5 wherein connection of said endless loop to said gate ends includes damping means for easing impact upon said driving means when said gate impacts with an obstacle.

8. In an animal gathering pen of the type having one of its ends terminating in an animal receiving station, another of its ends terminating in an animal processing station, a pair of parallel elongated sides extending between said ends, a gate movable between both sides for sweeping animals within the pen from said receiving station to said processing station, means coupling said gates to said sides for movable support of said gate, and running rigging to effect the sweeping movement of said gate, and an improved driving mechanism, wherein the improvement comprises: a motor; means for driving said running rigging coupled to said motor; said driving means including a belt between said drive means and said motor for transmitting power to said driving means to drive said running rigging to move said gate; means for mechanically sensing power transmitted by said belt including at least one lever mounted adjacent said belt, said lever having one of its ends impinging against said belt; means for interrupting operation of said motor operatively connected to said lever such that when said belt is placed under tension said lever will move causing interruption of the operation of said motor to stop the sweeping movement of said gate when said gate strikes an obstacle during the sweep of said pen.

9. The invention of claim 8, wherein said stopping means comprises at least one limit switch which terminates power to said motor.

10. The invention of claim 8, wherein said stopping means includes a timer and a time delay relay cooperative with said timer.

* * * * *